(12) United States Patent
Yokohama et al.

(10) Patent No.: US 8,721,034 B2
(45) Date of Patent: May 13, 2014

(54) INKJET RECORDING METHOD

(71) Applicants: Yuuki Yokohama, Kanagawa (JP);
Hiroshi Gotou, Kanagawa (JP);
Hidetoshi Fujii, Kanagawa (JP)

(72) Inventors: Yuuki Yokohama, Kanagawa (JP);
Hiroshi Gotou, Kanagawa (JP);
Hidetoshi Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/719,604

(22) Filed: Dec. 19, 2012

(65) Prior Publication Data
US 2013/0194343 A1 Aug. 1, 2013

(30) Foreign Application Priority Data
Feb. 1, 2012 (JP) .................. 2012-020342

(51) Int. Cl.
*C09D 11/02* (2006.01)
*G01D 11/00* (2006.01)

(52) U.S. Cl.
USPC ............................ 347/20; 347/100

(58) Field of Classification Search
USPC ................... 347/20, 100
See application file for complete search history.

(56) References Cited

U.S. PATENT DOCUMENTS

| 2007/0197685 A1 | 8/2007 | Aruga et al. |
| 2008/0233363 A1 | 9/2008 | Goto |
| 2009/0041940 A1 | 2/2009 | Yokohama et al. |
| 2009/0043028 A1 | 2/2009 | Matsuyama et al. |
| 2009/0047431 A1 | 2/2009 | Hatada et al. |
| 2009/0098312 A1 | 4/2009 | Goto et al. |
| 2009/0176070 A1 | 7/2009 | Goto et al. |
| 2010/0112219 A1 | 5/2010 | Yokohama et al. |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0205288 A1 | 8/2011 | Matsuyama et al. |
| 2011/0310166 A1 | 12/2011 | Namba et al. |
| 2012/0098883 A1 | 4/2012 | Matsuyama et al. |
| 2012/0207983 A1 | 8/2012 | Matsuyama et al. |
| 2012/0293582 A1 | 11/2012 | Goto et al. |
| 2013/0147876 A1* | 6/2013 | Hakiri et al. .................... 347/20 |

FOREIGN PATENT DOCUMENTS

| JP | 8-041400 | 2/1996 |
| JP | 2012-036255 | 2/2012 |
| WO | WO2012018098 A1 * | 2/2012 ............. C09D 11/00 |

OTHER PUBLICATIONS

U.S. Appl. No. 13/605,533, filed Sep. 6, 2012, Hidetoshi Fuji, et al.
U.S. Appl. No. 13/611,764, filed Sep. 12, 2012, Akihiko Matsuyama, et al.

(Continued)

*Primary Examiner* — Lisa M Solomon
(74) *Attorney, Agent, or Firm* — Oblon, Spivak, McClelland, Maier & Neustadt, L.L.P.

(57) ABSTRACT

The inkjet recording method includes ejecting an inkjet ink toward a recording medium to form an ink image on the recording medium. The inkjet ink includes a pigment, water, a surfactant, and at least one of 3-methoxy-N,N-dimethylpropionamide and 3-n-butoxy-N,N-dimethylpropionamide. When Dp represents the diameter of a pigment portion in a dot image formed by dropping a droplet of the inkjet ink with a volume of 0.5 μl on the recording medium, and Dv represent the diameter of a vehicle portion in the dot image, the ratio Dv/Dp is from 1.4 to 1.7.

6 Claims, 4 Drawing Sheets

(56) References Cited

OTHER PUBLICATIONS

U.S. Appl. No. 13/606,075, filed Sep. 7, 2012, Hidetoshi Fujii, et al.
U.S. Appl. No. 13/581,447, filed Aug. 27, 2012, Hidetoshi Fujii, et al.
U.S. Appl. No. 13/205,837, filed Aug. 9, 2011, Yuuki Yokohama, et al.
U.S. Appl. No. 13/494,222, filed Jun. 6, 2012, Hidefumi Nagashima, et al.
U.S. Appl. No. 13/719,631, filed Dec. 19, 2012, Yokohama, et al.

* cited by examiner

INKJET RECORDING METHOD

CROSS-REFERENCE TO RELATED APPLICATIONS

This patent application is based on and claims priority pursuant to 35 U.S.C. §119 to Japanese Patent Application No. 2012-020342 filed on Feb. 1, 2012 in the Japan Patent Office, the entire disclosure of which is hereby incorporated by reference herein.

FIELD OF THE INVENTION

The present invention relates to an inkjet recording method.

BACKGROUND OF THE INVENTION

Since inkjet printers have low costs and can easily produce color images, inkjet printers have been rapidly spreading. Recently, there is a need for an inkjet printer capable of producing high quality images.

With respect to inkjet ink, an aqueous ink composition including a pigment, water, an organic solvent, a resin and a surface tension adjuster for inkjet ink compositions is disclosed. In this regard, the organic solvent of the ink composition is a compound having the following formula:

$$R^1OCH_2CH_2CONR^2R^3$$

wherein $R^1$ represents an alkyl group having 1 to 8 carbon atoms, and each of $R^2$ and $R^3$ independently represents a hydrogen atom, an alkyl group having 1 to 6 carbon atoms, or an alkyl group having 1 to 6 carbon atoms and including an ether bond therein.

The total content of water and the organic solvent is from 10% to 49% by weight based on the weight of the ink composition.

However, when images are recorded on plain papers by the ink composition, a color bleeding problem in that different color images, which are adjacent to each other, are mixed at the boundary portion thereof tends to be caused.

For these reasons, the inventors recognized that there is a need for an inkjet recording method, by which high quality images can be formed on plain papers without causing the color bleeding problem.

BRIEF SUMMARY OF THE INVENTION

As an aspect of the present invention, an inkjet recording method is provided which includes ejecting an inkjet ink toward a recording medium to form an ink image on the recording medium. The inkjet ink includes a pigment, water, a surfactant, and at least one of a compound having the following formula (1):

$$CH_3OCH_2CH_2CON(CH_3)_2 \quad (1), \text{ and}$$

another compound having the following formula (2):

$$CH_3CH_2CH_2CH_2OCH_2CH_2CON(CH_3)_2 \quad (2).$$

The inkjet recording method satisfies the following relation:

$$1.4 \leq Dv/Dp \leq 1.7,$$

wherein Dp and Dv respectively represent the diameter of a pigment portion and the diameter of a vehicle portion in an dot image formed by dropping a droplet of the inkjet ink with a volume of 0.5 μl on the recording medium.

The aforementioned and other aspects, features and advantages will become apparent upon consideration of the following description of the preferred embodiments taken in conjunction with the accompanying drawings.

DETAILED DESCRIPTION OF THE INVENTION

An embodiment of the inkjet recording method of the present invention will be described by reference to drawings.

The inkjet recording method of the present invention includes ejecting an inkjet ink toward a recording medium to form an image on the recording medium.

The inkjet ink includes a compound having formula (1) (i.e., 3-methoxy-N,N-dimethylpropionamide) and/or another compound having formula (2) (i.e., 3-n-butoxy-N,N-dimethylpropionamide) in addition to a pigment, water and a surfactant.

In the inkjet recording method of the present invention, the ratio Dv/Dp of the diameter (Dv) of a vehicle portion in an dot image formed by dropping a droplet of the inkjet ink with a volume of 0.5 μl on the recording medium to the diameter (Dp) of a pigment portion in the dot image is from 1.4 to 1.7. When the ratio Dv/Dp is less than 1.4 or greater than 1.7, the color bleeding problem is caused when images are formed on plain papers.

Figure 5:
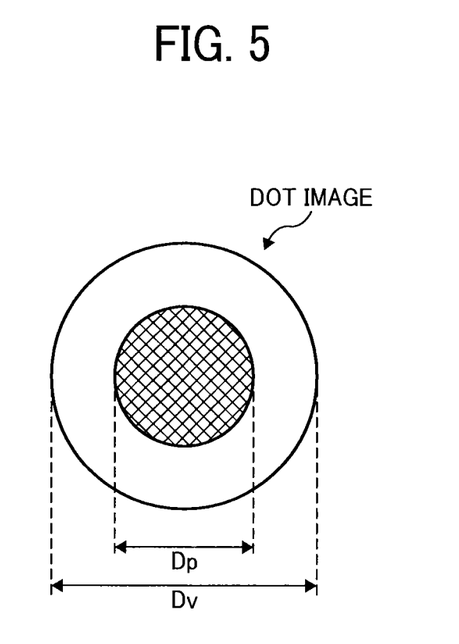
FIG. 5 is a schematic view for describing the method for measuring the diameters of a pigment portion and a vehicle portion in a dot image.

In this regard, the pigment portion means a colored portion in an dot image formed by dropping a droplet of the inkjet ink with a volume of 0.5 μl on the recording medium, and the vehicle portion means a non-colored portion in the dot image spreading at the periphery of the pigment portion. FIG. 5 illustrates a dot image formed by dropping a droplet of the inkjet ink with a volume of 0.5 μl on a recording medium, and Dp represents the diameter of a pigment portion and Dv represents the diameter of a vehicle portion.

When a droplet of the inkjet ink with a volume of 0.5 μl is dropped on the recording medium, a pipette is used. The pipette is not particularly limited, and for example NICHIPET EX from AS ONE Corporation can be used.

Since the inkjet ink used for the inkjet recording method of the present invention includes 3-methoxy-N,N-dimethylpropionamide and/or 3-n-butoxy-N,N-dimethylpropionamide, the ratio Dv/Dp of the diameter (Dv) of a vehicle portion in an dot image formed by dropping a droplet of the inkjet ink with a volume of 0.5 μl on a recording medium (i.e., a plain paper) to the diameter (Dp) of a pigment portion in the dot image can be controlled so as to fall in the range of from 1.4 to 1.7.

In this regard, plain papers used as the recording medium can include used paper and/or a sizing agent.

The compound (1), 3-methoxy-N,N-dimethylpropionamide, has a relatively high boiling point of 216° C., a relatively high equilibrium moisture content of 39.2% by weight at 23° C. and 80% RH, and a relatively low viscosity of 1.4 mPa·s at 25° C. In addition, since the compound (1) can be easily dissolved in water, the viscosity of the resultant inkjet ink can be decreased. Since the compound (2), 3-n-butoxy-N,N-dimethylpropionamide, also has a relatively low viscosity, the viscosity of the resultant inkjet ink can be decreased. In addition, the compounds (1) and (2) can enhance the wetting property of the inkjet ink on plain papers.

The total content of the compounds (1) and (2) in the inkjet ink is preferably from 15% to 20% by weight. When the total content is less than 15%, the diameter Dv of the vehicle portion tends to decreases. In contrast, when the total content is greater than 20%, the diameter Dv of the vehicle portion tends to increases. Therefore, when the total content is less than 15% by weight or greater than 20% by weight, it becomes hard to control the ratio Dv/Dp so as to fall in the range of from 1.4 to 1.7.

The inkjet ink for use in the inkjet recording method of the present invention can include a wetting agent.

Specific examples of such a wetting agent include polyhydric alcohols such as ethylene glycol, diethylene glycol, triethylene glycol, polyethylene glycol, polypropylene glycol, 1,3-butanediol, 3-methyl-1,3-butanediol, 1,5-pentanediol, 1,6-hexanediol, 2-ethyl-1,3-hexanediol, glycerin, 1,2,6-hexanetriol, 1,2,3-butanetriol, 1,2,4-butanetriol, and petriol; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyhydric alcohols such as ethylene glycol monophenyl ether, and ethylene glycol monobenzyl ether; nitrogen-containing alicyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanol amine, diethanol amine, and triethylamine; sulfur-containing compounds such as dimethyl sulfoxide, sulforane, and thiodiethanol; propylene carbonate, and ethylene carbonate. Among these wetting agents, 3-methyl-1,3-butanediol, 1,3-butanediol, and glycerin are preferable.

The content of such a wetting agent in the inkjet ink is generally from 10% to 40% by weight. When the content is less than 10% by weight or greater than 40% by weight, the ejection stability of the inkjet ink tends to deteriorate.

Organic pigments and inorganic pigments can be used as the pigment to be included in the inkjet ink. In this regard, a dye can be used in combination with a pigment to adjust the color tone of the ink.

Specific examples of the inorganic pigments include, but are not limited thereto, titanium oxide, iron oxide, calcium carbonate, barium sulfate, aluminum hydroxide, barium yellow, cadmium red, chrome yellow, and carbon black.

The preparation method of carbon black is not particularly limited, and for example, contact methods, furnace methods, and thermal methods can be used.

Specific examples of the organic pigments include, but are not limited thereto, azo pigments such as azo lakes, insoluble azo pigments, condensed azo pigments, and chelated azo pigments; polycyclic pigments such as phthalocyanine pigments, perylene pigments, perynone pigments, anthraquinone pigments, quinacridone pigments, dioxazine pigments, indigo pigments, thioindigo pigments, isoindolinone pigments, and quinophthalone pigments; chelated dyes such as basic dye-type chelates, and acidic dye-type chelates; nitro pigments, nitroso pigments, and Aniline Black. Among these pigments, azo pigments and polycyclic pigments are preferable.

The color of the pigment included in the inkjet ink is not particularly limited, and one or more pigments for forming black color and chromatic colors are used so that the resultant ink has the target color.

Specific examples of black color pigments include carbon blacks (i.e., C.I. Pigment Black 7) such as furnace black, gas black, lamp black, acetylene black, and channel black; powders of metals (i.e., C.I. Pigment Black 11) such as copper and iron; metal oxides such as titanium oxide; and organic pigments such as Aniline Black (i.e., C.I. Pigment Black 1).

Specific examples of chromatic color pigments include C.I. Pigment Yellows 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153 and 183; C.I. Pigment Oranges 5, 13, 16, 17, 36, 43 and 51; C.I. Pigment Reds 1, 2, 3, 5, 17, 22, 23, 31, 38, 48:2, 48:2 (permanent red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209 and 219; C.I. Pigment Violets 1 (Rhodamine Lake), 3, 5:1, 16, 19, 23 and 38; C.I. Pigment Blues 1, 2, 15 (Phthalocyanine Blue), 15:1, 15:2, 15:3 (Phthalocyanine Blue), 16, 17:1, 56, 60 and 63; and C.I. Pigment Greens 1, 4, 7, 8, 10, 17, 18 and 36.

The pigment included in the inkjet ink is preferably a pigment having a self-dispersing property which can be dispersed in water without using a pigment dispersant. Such a pigment having a self-dispersing property is hereinafter referred to as a self-dispersing pigment.

Self-dispersing pigments having a volume average particle diameter (D50) of from 0.01 μm to 0.16 μm are preferably used for the inkjet ink.

Self-dispersing pigments having an ionic group (anionic or cationic groups) on the surface thereof are preferably used.

Specific examples of the anionic groups of self-dispersing pigments include, but are not limited thereto, —COO$^-$M$^+$, —SO$_3^-$M$^+$, —PO$_3$H$^-$M$^+$, and —PO$_3^{2-}$M$^+_2$, wherein M$^+$ represents a proton, an alkali metal ion, an ammonium ion, or an organic ammonium ion.

Specific examples of the alkali metal ion include lithium, sodium and potassium ions.

Specific examples of the organic ammonium ion include mono- to tri-methylammonium ions, mono- to tri-ethylammonium ions, and mono- to tri-methanolammonium ions.

Specific examples of the method for forming such an anionic group on the surface of a pigment include a method in which a pigment is subjected to an oxidation treatment using sodium hydrochlorite; a method in which a pigment is sulfonated; and a method in which a pigment is reacted with a diazonium salt.

Specific examples of the cationic groups of self-dispersing pigments include, but are not limited thereto, the following quaternary ammonium groups.

These quaternary ammonium groups are used in combination with a counter ion.

Carbon blacks having a surface, to which such a cationic group is bonded, (i.e., self-dispersing carbon blacks) are preferably used for the inkjet ink for use in the present invention.

The method for preparing carbon black having a cationic group on the surface thereof is not particularly limited. For example, a method in which the surface of a carbon black is treated with 3-amino-N-ethylpyridium bromide can be used.

Such self-dispersing pigments can have a configuration such that such an ionic group is bonded to the surface thereof with a group therebetween. Specific examples of such an intervening group include alkyl groups having 1 to 12 carbon atoms, substituted or unsubstituted phenyl groups, and substituted or unsubstituted naphthyl groups.

The ionic group bonded to the surface of such self-dispersing pigments with a group therebetween is not particularly limited, and for example, groups having the following formulae can be used:

—$CH_2CH_2COO^-M^+$, wherein $M^+$ represents an alkali metal ion, or a quaternary ammonium ion,

—R—$SO_3^-M^+$, wherein R represents a phenylene group, and $M^+$ represents an alkali metal ion, or a quaternary ammonium ion, and

—$CH_2CH_2CH_2CH_2CH_2NH_3^+X^-$, wherein $X^-$ represents a halogen ion.

The pigment can be dispersed in the inkjet ink using a dispersant. Suitable materials for use as the dispersant include anionic surfactants, and nonionic surfactants having a HLB of from 10 to 20.

Specific examples of such anionic surfactants include, but are not limited thereto, polyoxyethylene alkyl ether acetates, alkylbenzene sulfonates (e.g., $NH_4$, Na, and Ca salts), alkyldiphenyl ether disulfonates (e.g., $NH_4$, Na, and Ca salts), sodium dialkylsuccinate sulfonate, sodium salts of formalin condensate of naphthalene sulfonic acid, salts (e.g., $NH_4$, and Na salts) of sulfuric acid esters of polyoxyethylene polycyclic-phenyl ethers, laurates, polyoxyethylene alkyl ether sulfates, and oleates. Among these anionic surfactants, sodium dioctylsulfosuccinate, and ammonium salts ($NH_4$) of polyoxyethylene styrenated-phenyl ether sulfonic acid are preferable.

Specific examples of the above-mentioned nonionic surfactants having a HLB value of from 10 to 20 include, but are not limited thereto, polyoxyethylene alkyl ethers, polyoxyalkylene alkyl ethers, polyoxyethylene polycyclic-phenyl ethers, sorbitan fatty acid esters, polyoxyethylene sorbitan fatty acid esters, polyoxyethylene alkylphenyl ethers, polyoxyethylene alkylamines, polyoxyethylene alkylamides, and acetylene glycol. Among these surfactants, polyoxyethylene lauryl ether, polyoxyethylene-β-naphthyl ether, polyoxyethylene sorbitan monooleate, and polyoxyethylene styrenated-phenyl ether are preferable.

Such a pigment dispersant is included in the inkjet ink in an amount of from 0.01 to 1 part by weight, and preferably 0.10 to 0.50 parts by weight, based on 1 part by weight of the pigment included in the inkjet ink. When the added amount of such a pigment dispersant is less than 0.01 parts, it is often hard to finely disperse the pigment. In contrast, when the added amount is greater than 1 part, the color bleeding problem tends to be caused.

The method for dispersing a pigment is not particularly limited. For example, a method including dissolving a dispersant in water, adding a pigment thereto, and then dispersing the mixture using a dispersing machine can be used. Specific examples of such a dispersing machine include, but are not limited thereto, high speed agitators such as homogenizers; dispersing machines using ball media such as bead mills and ball mills; dispersing machines using a shearing force such as roll mills; and ultrasonic dispersing machines.

After performing the dispersing operation, the resultant dispersion is preferably subjected to filtering using a filter or centrifugal separator to remove coarse particles therefrom.

Particles of a pigment dispersed in water (in the ink) preferably have a volume average particle diameter (D50) of not greater than 150 nm, and more preferably not greater than 100 nm. When the volume average particle diameter (D50) is greater than 150 nm, the ejection stability of the inkjet ink tends to deteriorate.

Particulate resins in which a pigment is dispersed or on which a pigment is adhered can also be used as the pigment to be included in the inkjet ink.

Specific examples of resins constituting the particulate resins include, but are not limited thereto, vinyl resins, polyester resins, and polyurethane resins. Among these resins, vinyl resins, and polyester resins are preferable. Specific examples of the resins include the resins described in JP2000-53897A and JP2001-139849 incorporated herein by reference.

The surfactant to be included in the inkjet ink is not particularly limited as long as the surfactant can improve the leveling property of the ink. Suitable materials for use as the surfactants include fluorine-containing surfactants, silicone surfactants, and anionic surfactants, nonionic surfactants. These surfactants can be used alone or in combination.

The number of carbon atoms having a fluorine atom in such fluorine-containing surfactants is generally from 2 to 16, and preferably from 4 to 16. When the number of carbon atoms having a fluorine atom is less than 2, the leveling property of the resultant ink tends to deteriorate. When the number is greater than 16, the ejection property of the resultant ink tends to deteriorate.

Specific examples of fluorine-containing anionic surfactants include perfluoroalkylsulfonic acids, salts of perfluoroalkylsulfonic acids, perfluoroalkylcarboxylic acids, salts of perfluoroalkylcarboxylic acids, salts of perfluoroalkylphosphates, and salts of sulfates of polyoxyalkylene ethers having a perfluoroalkyloxy group in a side chain thereof.

Specific examples of the counter ions of these fluorine-containing anionic surfactants include a lithium ion, a sodium ion, a potassium ion, an ammonium ion, a monoethanolammonium ion, a diethanolammonium ion, and a triethanolammonium ion.

Among these fluorine-containing anionic surfactants, compounds having one of the following formulae (1)-(4) are preferable.

(1)

In formula (1), Rf represent a group having the following formula (A) or (B).

(A)

(B)

In formula (1), A represents a group having one of the following formulae.

$$-SO_3^- M^+, -COO^- M^+, \text{ and } -PO_3^- M^+$$

wherein $M^+$ represents a proton, a lithium ion, a sodium ion, a potassium ion, an ammonium ion, a monoethanolammonium ion, a diethanolammonium ion, and a triethanolammonium ion.

(2)

In formula (2), $M^+$ is defined above, n is an integer of from 3 to 10, and Rf' represents a group having the following formula (C).

(C)

(3)

In formula (3), $M^+$ is defined above, and Rf' represents a group having the above-mentioned formula (C).

(4)

In formula (4), $M^+$ is defined above, and Rf' represents a group having the above-mentioned formula (C).

Specific examples of fluorine-containing nonionic surfactants include perfluoroalkyl phosphates, perfluoroalkylethylene oxide adducts, and polyoxyalkylene ethers having a perfluoroalkyloxy group in a side chain thereof. Among these compounds, polyoxyalkylene ethers having a perfluoroalkyloxy group in a side chain thereof are preferable because of hardly foaming.

Among such polyoxyalkylene ethers compounds, compounds having one of the following formulae (5)-(7) are preferable.

(5)

wherein m is 0 or an integer of from 1 to 10, and n is 0 or an integer of from 1 to 40.

(6)

wherein Rf represents a group having the above-mentioned formula (A) or (B), and n is an integer of from 5 to 20.

(7)

wherein Rf' represents a group having the above-mentioned formula (C), and n is an integer of from 1 to 40.

Fluorine-containing ampholytic surfactants having the following formula (8) can also be preferably used.

(8)

wherein Rf represents a group having the above-mentioned formula (A) or (B).

In addition, oligomer type fluorine-containing surfactants having the following formula (9) or (10) can also be preferably used.

(9)

In formula (9), $M^+$ is defined above, and Rf'' represents a group having the following formula (D):

(D)

wherein n is an integer of from 1 to 4.

(10)

In formula (10), Rf" represents a group having the above-mentioned formula (D), and each of k, m and n is independently an integer of from 1 to 10.

Marketed fluorine-containing surfactants can be used. Specific examples thereof include SARFRONs S-111, S-112, S-113, S-121, S-131, S-132, S-141 and S-145, which are manufactured by Asahi Glass Co., Ltd.; FLUORADs FC-93, FC-95, FC-98, FC-129, FC-135, FC-170C, FC-430 and FC-431, which are manufactured by Sumitomo 3M Ltd.; MEGAFACEs F-470, F-1405 and F-474, which are manufactured by DIC Corp.; ZONYLs TBS, FSP, FSA, FSN-100, FSN, FSO-100, FSO, FS-300 and UR, which are manufactured by Du Pont; FT-110, FT-250, FT-251, FT-400S, FT-150 and FT-400SW, which are manufactured by Neos Co., Ltd.; and POLYFOX PF-151N, which is manufactured by Om Nova Solutions, Inc.; and UNIDYNE DSN-403N from Daikin Industries, Ltd.

The silicone surfactant mentioned above for use in the inkjet ink is not particularly limited. Suitable materials for use as the silicone surfactant include polydimethylsiloxane whose side chains are modified, polydimethylsiloxane whose both ends are modified, polydimethylsiloxane whose one end is modified, and polydimethylsiloxane whose both ends and side chains are modified. Among these surfactants, polyether-modified silicone surfactants, which have a polyoxyethylene group or a polyoxyethylenepolyoxypropylene group as a modification group, are preferable.

Among polyether-modified silicone surfactants, compounds having the following formula (11) are preferable.

(11)

In formula (11), R represents an alkylene group, R' represents an alkyl group, and each of m, n, a and b is independently an integer.

Specific examples of marketed products of such polyether-modified silicone surfactants include KF-618, KF-642 and KF-643 from Shin-Etsu Chemical Co., Ltd.

Any known anionic surfactants can be used for the inkjet ink, and polyoxyethylene alkyl ether acetates, dodecylbenzene sulfonates, laurates, and polyoxyethylene alkyl ether sulfates are preferably used.

Any known nonionic surfactants can be used for the inkjet ink, and polyoxyethylene alkyl ethers, polyoxypropylene polyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides are preferably used.

The content of such a surfactant in the inkjet ink is preferably from 0.01% to 3% by weight, and more preferably from 0.5% to 2% by weight, based on the total weight of the inkjet ink. When the content is less than 0.01% by weight, the leveling property of the inkjet ink is hardly enhanced. In contrast, when the content is greater than 3% by weight, the image density tends to decreases.

It is preferable that the inkjet ink for use in the present invention further includes a polyol having 8 to 11 carbon atoms and/or a polyol ether having 8 to 11 carbon atoms as a penetrant.

The penetrant to be included in the inkjet ink preferably has a water solubility of from 0.2% to 5.0% by weight at 25° C., and 2-ethyl-1,3-hexanediol, which has a water solubility of 4.2% by weight at 25° C., or 2,2,4-trimethyl-1,3-pentanediol, which has a water solubility of 2.0% by weight at 25° C., is preferably used.

Specific examples of other polyols having 8 to 11 carbon atoms include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Specific examples of other polyol ethers having 8 to 11 carbon atoms include diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether.

In addition, lower alcohols such as ethanol can also be used as the penetrant.

The content of such a penetrant in the inkjet ink is generally from 0.1% to 4.0% by weight. When the content is less than 0.1% by weight, the color bleeding problem tends to be caused. In contrast, when the content is greater than 4.0% by weight, the ejection stability of the inkjet ink tends to deteriorate and image density of images recorded by the inkjet ink tends to decrease.

The inkjet ink can further include a water-dispersing resin. Such a water-dispersing resin is present in water as an emulsion such as single-phase type emulsions, core-shell type emulsions, and power feed type emulsions.

Specific examples of the resins for use as such a water-dispersing resin include condensation-type synthetic resins such as polyester resins, polyurethane resins, epoxy resins, polyamide resins, polyether resins, poly(meth)acrylic resins, acrylic-silicone resins, and fluorine-containing resins; addition-type synthetic resins such as polyolefin resins, polystyrene resins, polyvinyl alcohol resins, polyvinylester resins, polyacrylic acid resins, and unsaturated carboxylic acid resins; natural polymeric compounds such as cellulose resins, rosins, and natural rubbers. These resins can be used alone or in combination. Among these resins, polyurethane resins, acrylic-silicone resins, and fluorine-containing resins are preferable.

Among the fluorine-containing resins, fluorine-containing resins having a fluoro-olefin unit are preferable, fluorine-containing resins having a fluoro-olefin unit and a vinyl ether unit are more preferable, and alternate copolymers of a fluoro-olefin and vinyl ether are even more preferable.

Specific examples of the fluoro-olefin unit include —CF$_2$CF$_2$—, —CF$_2$CF(CF$_3$)—, and —CF$_2$CFCl—, but are not limited thereto.

Specific examples of the vinyl ether unit include groups having the following formulae, but are not particularly limited.

Specific examples of marketed products of such water-dispersing fluorine-containing resins include FLUONATEs FEM-500 and FEM-600, DICGUARDs F-52S, F-90, F-90M and F-90N, and AQUAFLAN TE-5A, which are manufactured by DIC Corp.; and LUMIFLONs FE4300, FE4500 and FE4400, and ASAHIGUARDs AG-7105, AG-950, AG-7600, AG-7000 and AG-1100, which are manufactured by Asahi Glass Co., Ltd.

The water-dispersing resin to be included in the inkjet ink may be a homopolymer or a copolymer.

Such a water-dispersing resin is used as an aqueous resin dispersion such that a resin having self-dispersing property is dispersed in water or an aqueous resin dispersion such that a resin is dispersed in water using a surfactant. Among these aqueous resin dispersions, resin dispersions prepared by subjecting ionomers of polyester resins and polyurethane resins, or unsaturated monomers to emulsion polymerization or suspension polymerization can be preferably used.

When preparing resin emulsions by subjecting an unsaturated monomer to emulsion polymerization, methods in which components such as an unsaturated monomer, a polymerization initiator, an emulsifier, a chain transfer agent, a chelating agent, and a pH controlling agent are reacted in water are typically used. Therefore, aqueous resin dispersions can be easily prepared.

Specific examples of unsaturated monomers for use in preparing aqueous resin dispersions include unsaturated carboxylic acids such as acrylic acid, methacrylic acid, itaconic acid, fumaric acid, and maleic acid; monofunctional (meth) acrylates such as methyl methacrylate, ethyl methacrylate, isopropyl methacrylate, n-butyl methacrylate, iso-butyl methacrylate, n-amyl methacrylate, iso-amyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyl trimethyl ammonium salt, 3-methacryloxypropyl trimethoxysilane, methyl acrylate, ethyl acrylate, isopropyl acrylate, n-butyl acrylate, iso-butyl acrylate, n-amyl acrylate, iso-amyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyl trimethyl ammonium salt; polyfunctional (meth)acrylates such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropiloxyphenyl)propane, 2,2'-bis(4-acryloxydiethoxyphenyl)propane, trimethylolpropane triacrylate, trimethylolethane triacrylate, tetramethylolmethane triacrylate, ditrimethylolpropane tetraacrylate, tetramethylolmethane tetraacrylate, pentaerythritol tetraacrylate, and dipentaerythritol hexaacrylate; (meth)acrylamide monomers such as acrylamide, methacrylamide, N,N-dimethylacrylamide, methylenebisacrylamide, and 2-acrylamide-2-methylpropane sulfonic acid; aromatic vinyl monomers such as styrene, α-methylstyrene, vinyl toluene, 4-t-butylstyrene, chlorostyrene, vinyl anisole, vinyl naphthalene, and divinyl benzene; vinyl cyano monomers such as acrylonitrile, and methacrylonitrile; vinyl monomers such as vinyl acetate, vinylidene chloride, vinyl chloride, vinyl ether, vinyl ketone, vinyl pyrrolidone, vinylsulfonic acid and salts thereof, vinyl trimethoxysilane, and vinyl triethoxysilane; allyl compounds such as allylsulfonic acid and salts thereof, allylamine, allylchloride, diallylamine, and diallyldimethylammonium salts; olefins such as ethylene and propylene; diene compounds such as butadiene and chloroprene; and oligomers having unsaturated carbon such as styrene oligomers having a methacryloyl group, styrene-acrylonitrile oligomers having a methacryloyl group, methyl methacrylate oligomers having a methacryloyl group, dimethylsiloxane oligomers having a methacryloyl group, and polyester oligomers having an acryloyl group. These monomers can be used alone or in combination.

The pH of the inkjet ink is generally from 4 to 12 at 25° C., and from the viewpoint of miscibility with water-dispersing colorants, the pH is more preferably 6 to 11, and even more preferably from 7 to 9. When the pH is less than 4 or greater than 12, the aqueous resin dispersion included therein tends to be destroyed or subjected to molecular chain cutting such as hydrolysis.

The volume average particle diameter (D50) of the above-mentioned aqueous resin dispersion is generally not less than 50 nm. When the volume average particle diameter (D50) is less than 50 nm, the viscosity of the aqueous resin dispersion tends to excessively increase, resulting in increase of the viscosity of the resultant inkjet ink. In addition, the volume average particle diameter (D50) of the aqueous resin dispersion is generally not greater than 200 nm, and preferably not greater than 150 nm When the volume average particle diameter (D50) is greater than 200 nm, the ejection stability of the resultant inkjet ink tends to deteriorate.

Such an aqueous resin dispersion is included in the inkjet ink to enhance the fixability of the colorant in the ink to recording media such as papers. Therefore, the aqueous resin dispersion preferably has a minimum film forming temperature (MFT) of not higher than 30° C.

The water-dispersing resin of the aqueous resin dispersion preferably has a glass transition temperature of not lower than −40°. When the glass transition temperature is lower than −40°, the resultant film of the resin becomes viscous, and therefore the resultant ink images tend to have tackiness.

The content on a dry basis of such a water-dispersing resin in the inkjet ink is generally from 1% to 15% by weight, and preferably from 2% to 7% by weight, based on the weight of the inkjet ink.

The inkjet ink for use in the present invention can further include other components such as pH controlling agents, antiseptics/fungicides, chelating agents, anti-rust agents, antioxidants, and ultraviolet absorbents.

The pH controlling agent is not particularly limited as long as the pH controlling agent can control the pH of the inkjet ink in a pH range of from 7 to 11. Specific examples thereof include alcoholamines such as diethanolamine, triethanolamine, and 2-amino-2-ethyl-1,3-propanediol; hydroxides of alkali metals such as lithium hydroxide, sodium hydroxide, and potassium hydroxide; ammonium hydroxides such as ammonium hydroxide, and quaternary ammonium hydroxide; phosphonium hydroxides such as quaternary phosphonium hydroxide; and carbonates of alkali metals such as lithium carbonate, sodium carbonate, and potassium carbonate.

Specific examples of the antiseptics/fungicides include sodium dehydroacetate, sodium sorbate, sodium salt of 2-pilidinethiol-1-oxide, sodium benzoate, and sodium salt of pentachlorophenol.

Specific examples of the chelating agents include sodium ethylenediamine tetraacetate, sodium nitrilotriacetate, sodium hydroxyethylethylenediaminetriacetate, sadium diethylenetriaminepentaacetate, and sodium uramildiacetate.

Specific examples of the anti-rust agents include acidic sulfites, sodium thiosulfate, ammonium thioglycolate, diisopropylammonium nitrite, pentaerythritol tetranitrate, and dicyclohexylammonium nitrite.

Specific examples of the antioxidants include, but are not limited thereto, phenolic antioxidants such as butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis{1,1-dimethyl-2-[β-(3-tert-butyl-4-hydroxy-5-methylphenyl)propionyloxy]ethyl}-2,4,8,10-tetraoxaspiro[5,5]undecane, 1,1,3-tris(2-methyl-4-hydroxy-5-tert-butylphenyl)butane, 1,3,5-trimethyl-2,4-6-tris(3,5-di-tert-butyl-4-hydroxybenzyl)benzene, and tetrakis [methylene-3-(3',5'-di-tert-butyl-4'-hydroxyphenyl) propionate]methane; amine type antioxidants such as phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butylphenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate] methane, and 1,1,3-tris(2-methyl-4-hyroxy-5-tert-butylphenyl)butane; sulfur-containing antioxidants such as dilauryl-3,3'-thiodipropionate, distearyl thiodipropionate, laurylstearyl thiodipropionate, dimyristyl-3,3'-thiodipropionate, distearyl-β,β'-thiodipropionate, 2-mercaptobenzoimidazole, and dilauryl sulfide; and phosphorus-containing antioxidants such as triphenyl phosphite, octadecyl phosphite, triisodecyl phosphite, trilauryl trithiophosphite, and trinonylphenyl phosphite.

Specific examples of the ultraviolet absorbents include benzophenone type ultraviolet absorbents such as 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone; benzotriazole type ultraviolet absorbents such as 2-(2'-hydroxy-5'-t-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-t-butyl-5'-methylphenyl)-5-chlorobenzotriazole; salicylate type ultraviolet absorbents such as phenyl salicylate, p-tert-butylphenyl salicylate, and p-octylphenyl salicylate; cyanoacrylate type ultraviolet absorbents such as ethyl-2-cyano-3,3'-diphenyl acrylate, methyl-2-cyano-3-methyl-3-(p-methoxyphenyl) acrylate, and butyl-2-cyano-3-methyl-3-(p-methoxyphenyl) acrylate; and nickel complex type ultraviolet absorbents such as nickelbis(octylphenyl) sulfide, 2,2'-thiobis(4-tert-octylferrate)-n-butylaminenickel(II), 2,2'-thiobis(4-tert-octylferrate)-2-ethylhexylaminenickel(II), and 2,2'-thiobis(4-tert-octylferrate)triethanolaminenickel(II).

The method for ejecting the inkjet ink is not particularly limited, and for example, methods in which stimulus (energy) is applied to the ink in an inkjet recording head to eject the ink from the inkjet recording head can be used.

In this regard, the inkjet recording head preferably has a configuration such that at least one of the liquid chamber, the fluid resistant portion, the vibrating plate and the nozzle includes silicon or nickel.

The nozzle preferably has a diameter of not greater than 30 μm, and more preferably from 1 μm to 20 μm.

The stimulus applied to the inkjet ink is not particularly limited, and specific examples thereof include heat (temperature), pressure, vibration, light, and combinations thereof. Among these stimuli, heat and pressure are preferable.

When the stimulus is heat, heat energy is applied to the ink in an inkjet recording head according to image information signals using a resistor to form a bubble in the ink, thereby ejecting the ink in the recording head from a nozzle by the pressure of the bubble.

When the stimulus is pressure, a voltage is applied to a piezoelectric element adhered to a pressure chamber present in an ink flow path in an inkjet recording head to bend the piezoelectric element, thereby decreasing the volume of the pressure chamber, resulting in ejection of the inkjet ink from a nozzle.

The volume of an inkjet ink droplet ejected from a nozzle is generally from $3 \times 10^{-15}$ to $40 \times 10^{-15}$ m$^3$ (i.e., 3 to 40 pl).

The speed of an ejected ink droplet is generally from 5 to 20 m/s.

The vibration frequency of a piezoelectric element is generally not less than 1 kHz.

The resolution of images recorded by ejected ink droplets is generally not less than 300 dpi (dots per inch).

The inkjet recording method of the present invention preferably includes controlling using a controller such as sequencers, and computers.

The recording medium on which ink images are formed is not particularly limited, and specific examples thereof include plain papers, special papers, cloths, films, OHP sheets, and general-purpose printing papers.

The inkjet recording method of the present invention can be applied to inkjet printers, inkjet facsimiles, inkjet copiers, inkjet printer/fax/copier multifunctional products and the like inkjet recording apparatuses.

Figure 1:
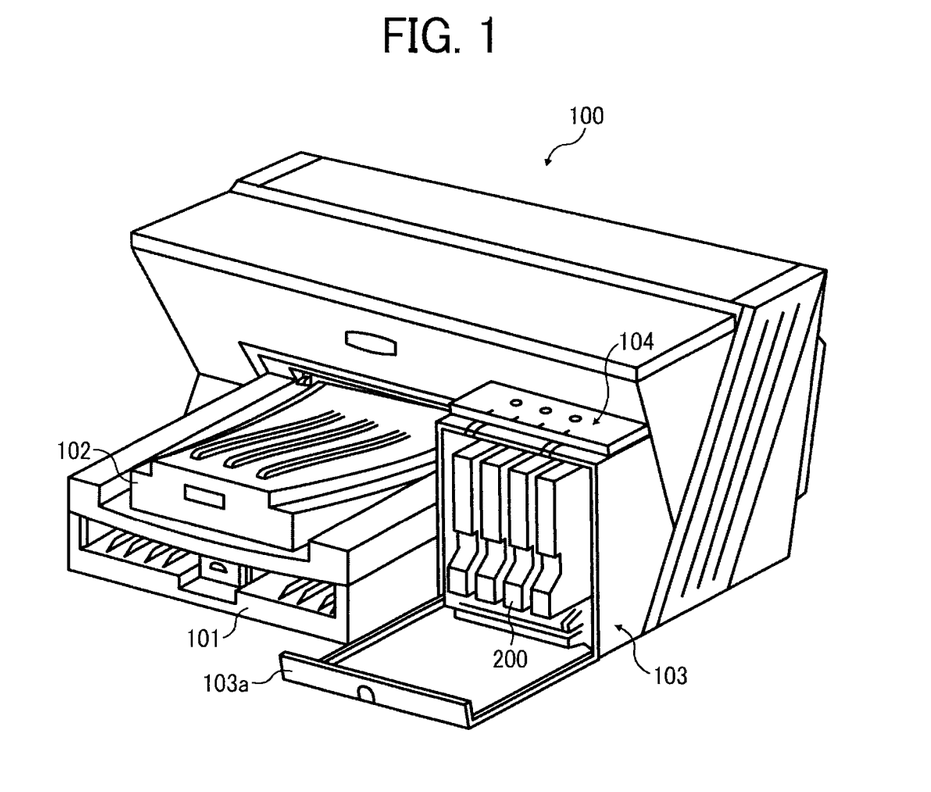
FIG. 1 is a perspective view illustrating an inkjet recording apparatus for use in the inkjet recording method of the present invention.

An inkjet recording apparatus for use in the inkjet recording method of the present invention is illustrated in FIG. 1.

Referring to FIG. 1, an inkjet recording apparatus 100 includes a recording sheet feed tray 101 on which a stack of recording sheets is set, a copy tray 102 on which recording sheets bearing images thereon are stacked, and an ink cartridge setting portion 103 to which ink cartridges 200 are detachably attached. On the upper surface of the ink cartridge setting portion 103, an operating portion 104 including operation keys, a display, etc. is arranged. The ink cartridge setting portion 103 has a front cover 103a which is openable and closable so that the ink cartridges 200 can be attached to the ink cartridge setting portion 103 or detached therefrom.

Figure 2:
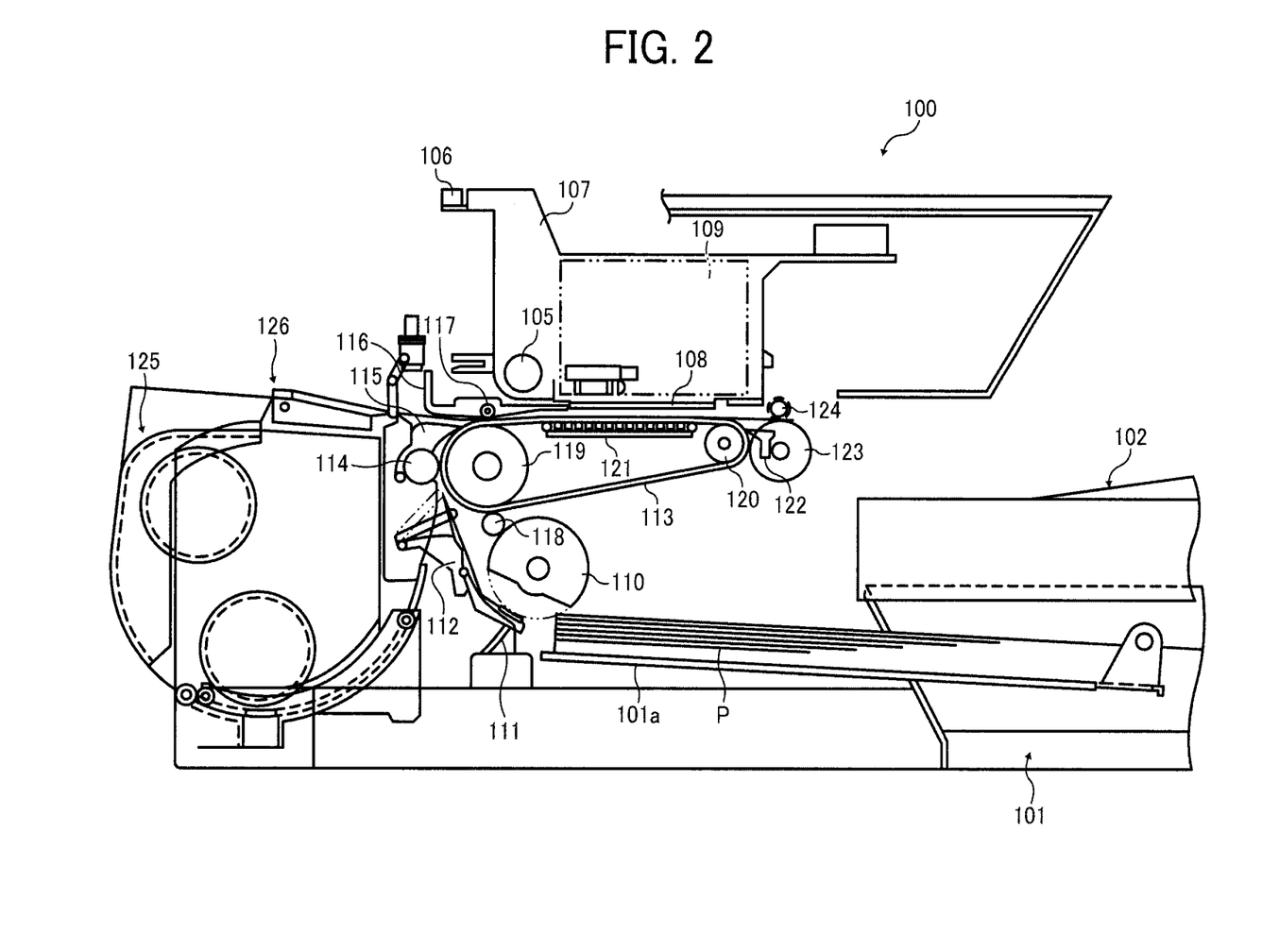
FIG. 2 is a side view of the inkjet recording apparatus illustrated in FIG. 1.
Figure 3:
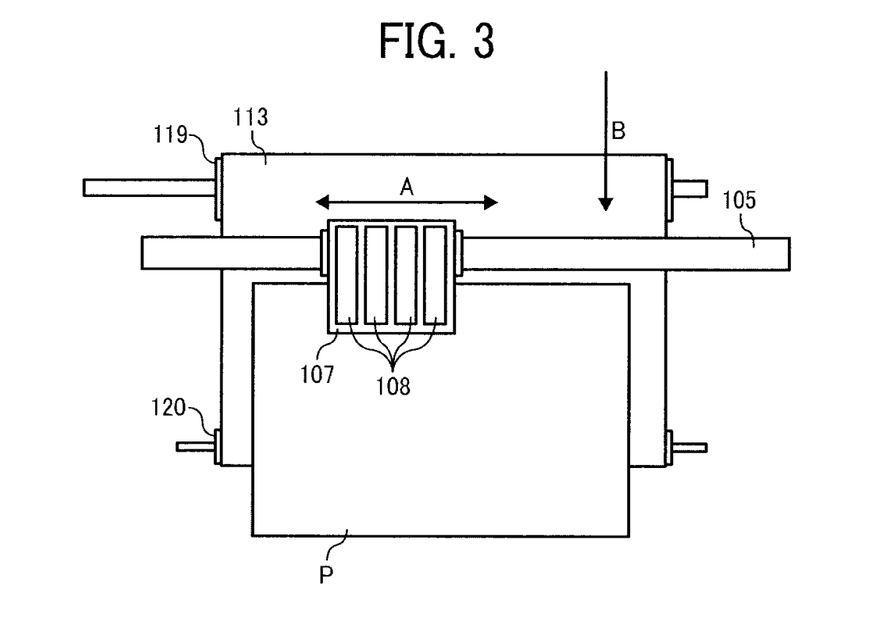
FIG. 3 is a partial enlarged view illustrating the inkjet recording head of the inkjet recording apparatus illustrated in FIG. 1.

As illustrated in FIGS. 2 and 3, a carriage 107 is slidably supported by a guide rod 105 and a stay 106, which are supported by both side plates (not shown) of the inkjet recording apparatus 100, so that the carriage 107 is moved in a main scanning direction A by a main scanning motor (not shown) to perform a scanning operation (i.e., image forming operation).

An inkjet recording head including four inkjet recording heads 108, each of which has multiple nozzles arranged in a direction perpendicular to the main scanning direction A to eject droplets of yellow (Y), magenta (M), cyan (C) or black (K) ink downward, is provided on the carriage 107.

Each of the four inkjet recording heads 108 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 109 to supply the color inkjet inks to the recording heads 108 are provided on the carriage 107. The color inkjet inks in the ink cartridges 200 set to the ink cartridge setting portion 103 are supplied to the respective sub-tanks 109 via respective ink supplying tubes (not shown).

The inkjet recording apparatus includes a recording sheet supplier to feed recording sheets P set on a sheet loading portion (pressing plate) 101a. The recording sheet supplier includes a sheet feeding roller 110 and a separation pad 111, which faces the sheet feeding roller 110 while being biased toward the sheet feeding roller and which is made of a material having a high friction coefficient, to feed the recording sheet P one by one from the sheet loading portion 101a.

The inkjet recording apparatus further includes a feeder to feed the recording sheet P, which has been fed by the recording sheet supplier along a guide 112, toward an image recording area located below the inkjet recording heads 108. The feeder includes a feeding belt 113 to feed the recording sheet P while electrostatically attracting the recording sheet, a counter roller 114 to feed the recording sheet P, which is fed from the recording sheet supplier along the guide 112, while sandwiching the recording sheet P with the feeding belt 113, a direction changing guide 115 to change the direction of the recording sheet P, which is fed substantially vertically, at an angle of about 90° so that the recording sheet P is contacted with the feeding belt 113 so as to be fed thereby, a pressing roller 117 which is biased toward the feeding belt 113 by a pressing member 116, and a charging roller 118 to charge the surface of the feeding belt 113.

The feeding belt 113 is an endless belt, which is tightly stretched by a feeding roller 119 and a tension roller 120 so as to be rotated in a recording sheet feeding direction B. In addition, a guide member 121 is arranged below the feeding belt 113 so as to face the recording area in which an image is recorded on the recording sheet P by the inkjet recording heads 108.

The material and configuration of the feeding belt 113 is not particularly limited. For example, the feeding belt 113 consists of a first layer (i.e., uppermost layer), which electrostatically attracts the recording sheet P and which is made of a resin layer (such as a tetrafluoroethylene-ethylene copolymer (ETFE) whose electrostatic resistance is not controlled) with a thickness of about 40 μm, and a second layer (i.e., medium resistance layer or grounding layer), which is made of almost the same material as that of the first layer except that carbon black is included therein so that the second layer has a medium electric resistance.

The inkjet recording apparatus 100 further includes a sheet discharger to discharge the recording sheet P bearing an image thereon from the main body of the apparatus. The sheet discharger includes a separation pick 122 to separate the recording sheet P from the feeding belt 113, and discharging rollers 123 and 124 to discharge the recording sheet P toward the copy tray 102 located below the discharging roller 123.

A duplex copy unit 125 is detachably attached to the backside of the main body of the inkjet recording apparatus 100. The duplex copy unit 125 receives the recording sheet P, which is fed to the duplex copy unit by reversely rotating the feeding belt 113, and feeds again the recording sheet P to the nip between the counter roller 114 and the feeding belt 113 so that another image is formed on the backside of the recording sheet P by the inkjet recording heads 108 in the recording area.

A manual sheet feeder 126, by which a recording sheet can be manually fed to the inkjet recording apparatus 100, is provided above the duplex copy unit 125.

Next, the image forming operation of the inkjet recording apparatus 100 will be described.

The recording sheet P is supplied one by one by the recording material supplier. The recording sheet P thus fed in substantially the vertical direction is guided by the guide 112 to the nip between the feeding belt 113 and the counter roller 114. The recording sheet P is guided by the direction changing guide 115 so that the direction of the sheet is changed at an angle of about 90°. The recording sheet P is then fed by the feeding belt 113 while pressed toward the feeding belt by the pressing roller 117.

Since the feeding belt 113 is charged by the charging roller 118, the recording sheet P is fed by the feeding belt 113 while electrostatically adhered thereto. Next, the carriage 107 is moved in the main scanning direction A while the inkjet recording heads 108 are driven according to image signals so as to eject droplets of the inkjet inks to form one line of image on the surface of the recording sheet P, which is stopped in the image forming operation. After recording one line of image, the recording sheet P is fed by a predetermined length, and the next image forming operation is performed to form another one line of image on the surface of the recording material sheet P. By repeating the image forming operation, an image is formed on the surface of the recording material sheet P. When the inkjet recording apparatus 100 receives a signal such that the image recording operation is completed or the rear edge of the recording sheet P reaches the recording area, the inkjet recording apparatus stops the image forming operation, and the sheet discharger discharges the recording sheet P bearing the image thereon to the copy tray 102.

When it is detected that the ink in the sub tank 109 is substantially exhausted (i.e., near-end of ink is detected), a predetermined amount of ink is supplied to the sub tank 109 from the corresponding ink cartridge 200.

When the ink in the ink cartridge 200 is exhausted, it is possible that after the ink cartridge is disassembled, the ink bag in the ink cartridge is replaced with a new ink bag, and then the ink cartridge 200 is assembled again to be attached to the inkjet recording apparatus 100. Even when the ink cartridge 200 is set so as to be vertical from a front side of the inkjet recording apparatus 100 as illustrated in FIG. 1, the ink in the ink cartridge 200 can be stably supplied to the corresponding sub tank 109. Therefore, even when the ink cartridge cannot be set from the upper side of the inkjet recording apparatus 100 due to space limitation (for example, in a case where the apparatus is set in a rack or an object is set on the upper surface of the apparatus), the ink cartridge 200 can be easily replaced.

Hereinbefore, the inkjet recording method of the present invention has been described by reference to a serial (shuttle-type) inkjet recording apparatus in which a carriage is scanned in the main scanning direction. However, the inkjet recording method of the present invention is not limited thereto, and can be used for line inkjet recording apparatus using a line-type inkjet recording head.

Figure 4:
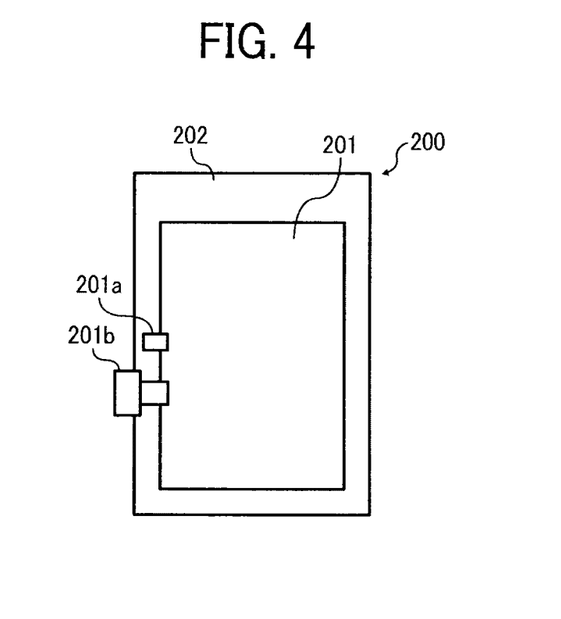
FIG. 4 is a schematic view illustrating the ink cartridge of the inkjet recording apparatus illustrated in FIG. 1.

As illustrated in FIG. 4, the ink cartridge 200 has a configuration such that an ink bag 201 containing such an inkjet ink as mentioned above is set in a plastic case 202, and is detachably attachable to the inkjet recording apparatus 100.

The ink bag 201 is made of a material such as aluminum-laminated films and resin films. The inkjet ink is injected into the ink bag 201 from an inlet 201a. After discharging air from the ink bag 201, the inlet 201a is closed by welding or the like. The ink bag 201 has an ink outlet 201b made of a rubber. When the ink bag 201 is used, the ink bag is set in an inkjet recording apparatus so that a needle of the inkjet recording apparatus is inserted into the ink outlet 201b of the ink bag 201, and thereby the ink in the ink bag 201 can be fed to the sub tank 109.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

1. Preparation of Dispersion of Self-dispersing Black Pigment

Ninety (90) grams of a carbon black having a CTAB specific surface area of 150 m²/g, and a DBP oil absorption of 100 ml/100 g was added to 3,000 ml of a 2.5N aqueous solution of sodium sulfate, and the mixture was heated to 60° C. while agitated for 10 hours by an agitator rotated at a speed of 300 rpm to perform a reaction. The reaction product was filtered, and the obtained carbon black was mixed with an aqueous solution of sodium hydroxide to neutralize the carbon black, followed by ultrafiltration using pure water and a dialysis membrane.

After the carbon black was washed with pure water, the carbon black was dried. The dried carbon black was dispersed in pure water while fully agitated to prepare a dispersion of a self-dispersing black pigment, which has a solid content of 30% by weight. The thus prepared carbon black pigment dispersion had a volume average particle diameter (D50) of 103 nm when the volume average particle diameter was measured with a particle diameter distribution measuring instrument, NANOTRACK UPA-EX150 from Nikkiso Co., Ltd.

2. Preparation of Dispersion of Particulate Resin Including Magenta Pigment (1) Preparation of Resin Solution After air inside a 1-liter flask, which is equipped with a mechanical agitator, a thermometer, a nitrogen gas feed pipe, a reflux tube, and a dropping funnel, was substituted with a nitrogen gas, the following components were fed thereto to prepare a mixture.

| | |
|---|---|
| Styrene | 11.2 g |
| Acrylic acid | 2.8 g |
| Lauryl methacrylate | 12.0 g |
| Polyethylene glycol methacrylate | 4.0 g |
| Styrene macromer | 4.0 g |
| Mercaptoethanol | 0.4 g |

The mixture was heated to 65° C.

Next, the following components were mixed and the mixture was dropped into the flask over 2.5 hours using the dropping funnel.

| | |
|---|---|
| Styrene | 100.8 g |
| Acrylic acid | 25.2 g |
| Lauryl methacrylate | 108.0 g |
| Polyethylene glycol methacrylate | 36.0 g |
| Hydroxyethyl methacrylate | 60.0 g |
| Styrene macromer | 36.0 g |
| Mercaptoethanol | 3.6 g |
| Azobismethylvaleronitrile | 2.4 g |
| Methyl ethyl ketone | 18.0 g |

Thereafter, a mixture of 0.8 g of azobismethylvaleronitrile and 18.0 g of methyl ethyl ketone was dropped into the flask over 0.5 hours using the dropping funnel.

After the reaction product in the flask was aged for 1 hour at 65° C., 0.8 g of azobismethylvaleronitrile was fed into the flask, and the mixture was further aged for 1 hour. Thereafter, 364.0 g of methyl ethyl ketone was fed into the flask.

Thus, 800 g of a resin solution having a solid content of 50% by weight was prepared.

(2) Preparation of Dispersion of Particulate Resin Including Magenta Pigment

The Following Components Were Mixed By agitation.

| | |
|---|---|
| Resin solution prepared above | 28 g |
| C.I. Pigment Red 122 | 42 g |
| 1 Mole/L aqueous solution of potassium hydroxide | 13.6 g |
| Methyl ethyl ketone | 20.0 g |
| Pure water | 13.6 g |

The mixture was kneaded using a roll mill. The thus prepared paste was fed into 200 g of pure water, and the mixture was fully agitated. Thereafter, methyl ethyl ketone and water were distilled away from the mixture using an evaporator to prepare a dispersion. Further, the dispersion was subjected to pressure-filtering using a polyvinylidene fluoride membrane filter having an average pore diameter of 5.0 μm to remove coarse particles. Thus, a dispersion of particulate resin including a magenta pigment, which has a pigment content of 15% by weight and a solid content of 20% by weight, was prepared. The volume average particle diameter (D50) of the magenta pigment-containing resin in the dispersion was 127 nm.

3. Preparation of Dispersion of Particulate Resin Including Cyan Pigment

The procedure for preparation of the magenta pigment-containing resin dispersion mentioned above was repeated except that the pigment (C.I. Pigment Red 122) was replaced with a cyan pigment (C.I. Pigment Blue 15:3) to prepare a cyan pigment-containing resin dispersion. The volume average particle diameter (D50) of the particulate resin in the dispersion was 93 nm.

4. Preparation of Dispersion of Particulate Resin Including Yellow Pigment

The procedure for preparation of the magenta pigment-containing resin dispersion mentioned above was repeated except that the pigment (C.I. Pigment Red 122) was replaced with a yellow pigment (C.I. Pigment Yellow 74) to prepare a yellow pigment-containing resin dispersion. The volume average particle diameter (D50) of the particulate resin in the dispersion was 76 nm.

5. Preparation of Inkjet Ink 1

The following components were mixed.

| | |
|---|---|
| 3-Methoxy-N,N-dimethylpropionamide | 5.00 parts |
| 3-n-Butoxy-N,N-dimethylpropionamide | 10.00 parts |
| 1,3-Butanediol (wetting agent) | 5.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 30.35 parts |

The mixture was agitated for 1 hour.

Next, 5.00 parts of an acrylic-silicone resin emulsion POLYSOL ROY6312 from Showa Denko K.K., which has a solid content of 37.2%, was added to the mixture, and the mixture was agitated for 1 hour. Further, 30.00 parts of the self-dispersing carbon black pigment dispersion prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 1 was prepared.

6. Preparation of Inkjet Ink 2

The following components were mixed.

| | |
|---|---|
| 3-Methoxy-N,N-dimethylpropionamide | 5.00 parts |
| 3-n-Butoxy-N,N-dimethylpropionamide | 10.00 parts |
| 1,3-Butanediol (wetting agent) | 5.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 31.35 parts |

The mixture was agitated for 1 hour.

Next, 4.00 parts of an acrylic-silicone resin emulsion AP-4710 from Showa Highpolymer Co. Ltd., which has a solid content of 50% by weight, was added to the mixture, and the mixture was agitated for 1 hour. Further, 30.00 parts of the dispersion of particulate resin including a magenta pigment prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 2 was prepared.

7. Preparation of Inkjet Ink 3

The following components were mixed.

| | |
|---|---|
| 3-Methoxy-N,N-dimethylpropionamide | 20.00 parts |
| 1,3-Butanediol (wetting agent) | 10.00 parts |
| Glycerin (wetting agent) | 10.00 parts |
| 2,2,4-Trimethyl-1,3-pentanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 20.35 parts |

The mixture was agitated for 1 hour.

Next, 5.00 parts of an acrylic-silicone resin emulsion POLYSOL ROY6312 from Showa Denko K.K., which has a solid content of 37.2%, was added to the mixture, and the mixture was agitated for 1 hour. Further, 30.00 parts of the self-dispersing carbon black pigment dispersion prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 3 was prepared.

8. Preparation of Inkjet Ink 4

The following components were mixed.

| | |
|---|---|
| 3-Methoxy-N,N-dimethylpropionamide | 20.00 parts |
| 1,3-Butanediol (wetting agent) | 10.00 parts |

-continued

| | |
|---|---|
| Glycerin (wetting agent) | 10.00 parts |
| 2,2,4-Trimethyl-1,3-pentanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 21.35 parts |

The mixture was agitated for 1 hour.

Next, 4.00 parts of an acrylic-silicone resin emulsion AP-4710 from Showa Highpolymer Co. Ltd., which has a solid content of 50%, was added to the mixture, and the mixture was agitated for 1 hour. Further, 30.00 parts of the dispersion of particulate resin including a cyan pigment prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 4 was prepared.

9. Preparation of Inkjet Ink 5

The following components were mixed.

| | |
|---|---|
| 3-n-Butoxy-N,N-dimethylpropionamide | 20.00 parts |
| 3-Methyl-1,3-butanediol (wetting agent) | 10.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 20.35 parts |

The mixture was agitated for 1 hour.

Next, 5.00 parts of an acrylic-silicone resin emulsion POLYSOL ROY6312 from Showa Denko K.K., which has a solid content of 37.2%, was added to the mixture, and the mixture was agitated for 1 hour. Further, 30.00 parts of the self-dispersing carbon black pigment dispersion prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 5 was prepared.

10. Preparation of Inkjet Ink 6

The following components were mixed.

| | |
|---|---|
| 3-n-Butoxy-N,N-dimethylpropionamide | 20.00 parts |
| 3-Methyl-1,3-butanediol (wetting agent) | 10.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 21.35 parts |

The mixture was agitated for 1 hour.

Next, 4.00 parts of an acrylic-silicone resin emulsion AP-4710 from Showa Highpolymer Co. Ltd., which has a solid content of 50%, was added to the mixture, and the mixture was agitated for 1 hour. Further, 30.00 parts of the dispersion of particulate resin including a yellow pigment prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 6 was prepared.

11. Preparation of Inkjet Ink 7

The following components were mixed.

| | |
|---|---|
| 3-Methoxy-N,N-dimethylpropionamide | 10.00 parts |
| 3-n-Butoxy-N,N-dimethylpropionamide | 10.00 parts |
| 3-Methyl-1,3-butanediol (wetting agent) | 10.00 parts |
| Glycerin (wetting agent) | 10.00 parts |
| 2,2,4-Trimethyl-1,3-pentanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 20.35 parts |

The mixture was agitated for 1 hour.

Next, 5.00 parts of an acrylic-silicone resin emulsion POLYSOL ROY6312 from Showa Denko K.K., which has a solid content of 37.2%, was added to the mixture, and the mixture was agitated for 1 hour. Further, 30.00 parts of the self-dispersing carbon black dispersion prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 7 was prepared.

12. Preparation of Inkjet Ink 8

The following components were mixed.

| | |
|---|---|
| 3-Methoxy-N,N-dimethylpropionamide | 10.00 parts |
| 3-n-Butoxy-N,N-dimethylpropionamide | 10.00 parts |
| 3-Methyl-1,3-butanediol (wetting agent) | 10.00 parts |
| Glycerin (wetting agent) | 10.00 parts |
| 2,2,4-Trimethyl-1,3-pentanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 21.35 parts |

The mixture was agitated for 1 hour.

Next, 4.00 parts of an acrylic-silicone resin emulsion AP-4710 from Showa Highpolymer Co. Ltd., which has a solid content of 50%, was added to the mixture, and the mixture was agitated for 1 hour. Further, 30.00 parts of the dispersion of particulate resin including a magenta pigment prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 8 was prepared.

13. Preparation of Inkjet Ink 9

The following components were mixed.

| | |
|---|---|
| 3-Methoxy-N,N-dimethylpropionamide | 4.00 parts |
| 3-n-Butoxy-N,N-dimethylpropionamide | 9.00 parts |
| 1,3-Butanediol (wetting agent) | 5.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 32.35 parts |

The mixture was agitated for 1 hour.

Next, 5.00 parts of an acrylic-silicone resin emulsion POLYSOL ROY6312 from Showa Denko K.K., which has a solid content of 37.2%, was added to the mixture, and the mixture was agitated for 1 hour. Further, 30.00 parts of the self-dispersing carbon black dispersion prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 9 was prepared.

14. Preparation of Inkjet Ink 10

The following components were mixed.

| | |
|---|---|
| 3-Methoxy-N,N-dimethylpropionamide | 4.00 parts |
| 3-n-Butoxy-N,N-dimethylpropionamide | 9.00 parts |
| 1,3-Butanediol (wetting agent) | 5.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 33.35 parts |

The mixture was agitated for 1 hour.

Next, 4.00 parts of an acrylic-silicone resin emulsion AP-4710 from Showa Highpolymer Co. Ltd., which has a solid content of 50%, was added to the mixture, and the mixture was agitated for 1 hour. Further, 30.00 parts of the dispersion of particulate resin including a cyan pigment prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 10 was prepared.

15. Preparation of Inkjet Ink 11

The following components were mixed.

| | |
|---|---|
| 3-Methoxy-N,N-dimethylpropionamide | 10.00 parts |
| 3-n-Butoxy-N,N-dimethylpropionamide | 20.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 20.35 parts |

The mixture was agitated for 1 hour.

Next, 5.00 parts of an acrylic-silicone resin emulsion POLYSOL ROY6312 from Showa Denko K.K., which has a solid content of 37.2%, was added to the mixture, and the mixture was agitated for 1 hour. Further, 30.00 parts of the self-dispersing carbon black dispersion prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 11 was prepared.

16. Preparation of Inkjet Ink 12

The following components were mixed.

| | |
|---|---|
| 3-Methoxy-N,N-dimethylpropionamide | 10.00 parts |
| 3-n-Butoxy-N,N-dimethylpropionamide | 20.00 parts |
| Glycerin (wetting agent) | 10.00 parts |
| 2-Ethyl-1,3-hexanediol (penetrant) | 2.00 parts |
| Polyoxyethylene perfluoroalkyl ether (ZONYL FS-300 from Du Pont, serving as a fluorine-containing surfactant including the active ingredient at 40% by weight) | 2.50 parts |
| Antiseptic (PROXEL GXL from Avecia Inc. including 1,2-benzothiazoline-3-one as a main component in an amount of 20% by weight while including dipropylene glycol) | 0.05 parts |
| Pure water | 21.35 parts |

The mixture was agitated for 1 hour.

Next, 4.00 parts of an acrylic-silicone resin emulsion AP-4710 from Showa Highpolymer Co. Ltd., which has a solid content of 50%, was added to the mixture, and the mixture was agitated for 1 hour. Further, 30.00 parts of the dispersion of particulate resin including a magenta pigment prepared above and 0.10 parts of a self emulsification type silicone defoaming agent (KM-72F from Shin-Etsu Chemical Co., Ltd., including the active ingredient at 100% by weight) were added to the mixture, and the mixture was agitated for 1 hour. The mixture was subjected to pressure-filtering using a polyvinylidene fluoride membrane filter having an average pore diameter of 5.0 μm to remove coarse particles. Thus, an inkjet ink 12 was prepared.

The thus prepared inkjet inks 1-12 were evaluated with respect to the following properties.

1. The Ratio Dv/Dp

After 0.5 μl of an inkjet ink was dropped on a plain paper using a pipette, NICHIPET EX from AS ONE Corporation, the diameter Dp of a pigment portion in the resultant dot image of the ink and the diameter Dv of a vehicle portion in the dot image were measured. The diameters Dp and Dv are described above by reference to FIG. 5.

In this regard, MY PAPER from NBS Ricoh Business Expert, Ltd. which is referred to as a plain paper 1; HAMMERMILL FORE MP from International Paper Company which is referred to as a plain paper 2; and a recycled paper 100 from Daio Paper Corp. which is referred to as a plain paper 3, were used as the plain paper.

The diameters Dp and Dv, and the ratio Dv/Dp of the inkjet inks 1-12 are shown in Table 1 below.

TABLE 1

| | Plain paper 1 | | | Plain paper 2 | | | Plain paper 3 | | |
|---|---|---|---|---|---|---|---|---|---|
| Inkjet ink | Dp (cm) | Dv (cm) | Dv/Dp | Dp (cm) | Dv (cm) | Dv/Dp | Dp (cm) | Dv (cm) | Dv/Dp |
| 1 | 2.78 | 3.89 | 1.40 | 2.15 | 3.60 | 1.67 | 2.36 | 3.30 | 1.40 |
| 2 | 2.77 | 3.88 | 1.40 | 2.14 | 3.61 | 1.69 | 2.35 | 3.28 | 1.40 |
| 3 | 2.65 | 3.77 | 1.42 | 2.11 | 3.49 | 1.65 | 2.10 | 3.00 | 1.43 |
| 4 | 2.66 | 3.75 | 1.41 | 2.15 | 3.47 | 1.61 | 2.12 | 3.05 | 1.44 |
| 5 | 2.51 | 3.59 | 1.43 | 2.07 | 3.44 | 1.66 | 1.95 | 2.80 | 1.44 |
| 6 | 2.51 | 3.60 | 1.43 | 2.07 | 3.43 | 1.66 | 1.97 | 2.82 | 1.43 |
| 7 | 2.59 | 3.65 | 1.41 | 2.10 | 3.49 | 1.66 | 2.04 | 2.90 | 1.42 |
| 8 | 2.58 | 3.64 | 1.41 | 2.11 | 3.51 | 1.66 | 2.02 | 2.91 | 1.44 |
| 9 | 2.90 | 3.41 | 1.18 | 2.23 | 3.29 | 1.48 | 2.71 | 3.29 | 1.21 |
| 10 | 2.91 | 3.40 | 1.17 | 2.22 | 3.29 | 1.48 | 2.71 | 3.26 | 1.20 |
| 11 | 2.43 | 3.63 | 1.49 | 2.07 | 3.68 | 1.78 | 1.90 | 3.31 | 1.74 |
| 12 | 2.39 | 3.58 | 1.50 | 2.06 | 3.59 | 1.74 | 1.90 | 3.28 | 1.73 |

Examples 1-28 and Comparative Examples 1-8

Ink images of each inkjet ink were formed on each of the plain papers 1-3 under an environmental condition of 23° C. and 50% RH using an inkjet printer IPSIO G717 from Ricoh Co., Ltd. In this regard, the driving voltage of the piezoelectric element of the printer was controlled so that the amounts of inks adhered to the plain papers are the same.

The evaluation items and the image forming operations therefor were as follows.

1. Color Bleeding

A copy of a chart including a black character image on a color solid image, which is prepared using Microsoft Word 2000, was formed on each of the plain papers 1-3 using a combination of the inks 1 and 2. Similarly, copies of the chart were formed on each of the plain papers 1-3 using one of a combination of the inks 3 and 4, a combination of the inks 5 and 6, a combination of the inks 7 and 8, a combination of the inks 9 and 10, and a combination of the inks 11 and 12. The copies were visually observed to determine whether the black and color images are blurred (i.e., whether color bleeding is caused).

The color bleeding property was graded as follows.

○ (Good): The images are not blurred.

Δ (Acceptable): The images are slightly blurred.

X (Bad): The images are blurred.

The evaluation results are shown in Tables 2-4 below.

TABLE 2

| | Inkjet ink | Plain paper | Dv/Dp | Content of X* (wt %) | Content of Y** (wt %) | X + Y (wt %) | Color bleeding |
|---|---|---|---|---|---|---|---|
| Ex. 1 | 1 | 1 | 1.40 | 5 | 10 | 15 | ○ |
| Ex. 2 | 2 | 1 | 1.40 | 5 | 10 | 15 | |
| Ex. 3 | 3 | 1 | 1.42 | 20 | 0 | 20 | ○ |
| Ex. 4 | 4 | 1 | 1.41 | 20 | 0 | 20 | |
| Ex. 5 | 5 | 1 | 1.43 | 0 | 20 | 20 | ○ |
| Ex. 6 | 6 | 1 | 1.43 | 0 | 20 | 20 | |
| Ex. 7 | 7 | 1 | 1.41 | 10 | 10 | 20 | ○ |
| Ex. 8 | 8 | 1 | 1.41 | 10 | 10 | 20 | |
| Comp. Ex. 1 | 9 | 1 | 1.18 | 4 | 9 | 13 | Δ |
| Comp. Ex. 2 | 10 | 1 | 1.17 | 4 | 9 | 13 | |
| Ex. 9 | 11 | 1 | 1.49 | 10 | 20 | 30 | ○ |
| Ex. 10 | 12 | 1 | 1.50 | 10 | 20 | 30 | |

The content of X*: The content of 3-methoxy-N,N-dimethylpropionamide.
The content of Y**: The content of 3-n-butoxy-N,N-dimethylpropionamide.

TABLE 3

| | Inkjet ink | Plain paper | Dv/Dp | Content of X* (wt %) | Content of Y** (wt %) | X + Y (wt %) | Color bleeding |
|---|---|---|---|---|---|---|---|
| Ex. 11 | 1 | 2 | 1.67 | 5 | 10 | 15 | ◯ |
| Ex. 12 | 2 | 2 | 1.69 | 5 | 10 | 15 | ◯ |
| Ex. 13 | 3 | 2 | 1.65 | 20 | 0 | 20 | ◯ |
| Ex. 14 | 4 | 2 | 1.61 | 20 | 0 | 20 | ◯ |
| Ex. 15 | 5 | 2 | 1.66 | 0 | 20 | 20 | ◯ |
| Ex. 16 | 6 | 2 | 1.66 | 0 | 20 | 20 | ◯ |
| Ex. 17 | 7 | 2 | 1.66 | 10 | 10 | 20 | ◯ |
| Ex. 18 | 8 | 2 | 1.66 | 10 | 10 | 20 | ◯ |
| Ex. 19 | 9 | 2 | 1.48 | 4 | 9 | 13 | ◯ |
| Ex. 20 | 10 | 2 | 1.48 | 4 | 9 | 13 | ◯ |
| Comp. Ex. 3 | 11 | 2 | 1.78 | 10 | 20 | 30 | △ |
| Comp. Ex. 4 | 12 | 2 | 1.74 | 10 | 20 | 30 | △ |

TABLE 4

| | Inkjet ink | Plain paper | Dv/Dp | Content of X* (wt %) | Content of Y** (wt %) | X + Y (wt %) | Color bleeding |
|---|---|---|---|---|---|---|---|
| Ex. 21 | 1 | 3 | 1.40 | 5 | 10 | 15 | ◯ |
| Ex. 22 | 2 | 3 | 1.40 | 5 | 10 | 15 | ◯ |
| Ex. 23 | 3 | 3 | 1.43 | 20 | 0 | 20 | ◯ |
| Ex. 24 | 4 | 3 | 1.44 | 20 | 0 | 20 | ◯ |
| Ex. 25 | 5 | 3 | 1.44 | 0 | 20 | 20 | ◯ |
| Ex. 26 | 6 | 3 | 1.43 | 0 | 20 | 20 | ◯ |
| Ex. 27 | 7 | 3 | 1.42 | 10 | 10 | 20 | ◯ |
| Ex. 28 | 8 | 3 | 1.44 | 10 | 10 | 20 | ◯ |
| Comp. Ex. 5 | 9 | 3 | 1.21 | 4 | 9 | 13 | △ |
| Comp. Ex. 6 | 10 | 3 | 1.20 | 4 | 9 | 13 | △ |
| Comp. Ex. 7 | 11 | 3 | 1.74 | 10 | 20 | 30 | △ |
| Comp. Ex. 8 | 12 | 3 | 1.73 | 10 | 20 | 30 | △ |

It is clear from Tables 2-4 that the inkjet recording methods of Examples 1-28 can produce images on plain papers without causing the color bleeding problem. In contrast, the color bleeding problem is caused by the methods of Comparative Examples 1, 2, 5 and 6 because the ratio Dv/Dp (1.18, 1.17, 1.21 and 1.20) is less than the range of from 1.4 to 1.7. In addition, the color bleeding problem is also caused by the methods of Comparative Examples 3, 4, 7 and 8 because the ratio Dv/Dp (1.78, 1.74, 1.74 and 1.73) is greater than the range of from 1.4 to 1.7.

Additional modifications and variations of the present invention are possible in light of the above teachings. It is therefore to be understood that within the scope of the appended claims the invention may be practiced other than as specifically described herein.

What is claimed is:

1. An inkjet recording method comprising:
   ejecting an inkjet ink toward a recording medium to form an ink image on the recording medium,
   wherein the inkjet ink includes a pigment, water, a surfactant, and at least one of a compound having the following formula (1):

$$CH_3OCH_2CH_2CON(CH_3)_2 \qquad (1),$$ and another compound having the following formula (2):

$$CH_3CH_2CH_2CH_2OCH_2CH_2CON(CH_3)_2 \qquad (2),$$ and wherein the inkjet recording method satisfies the following relation:

$$1.4 \leq Dv/Dp \leq 1.7,$$

wherein Dp and Dv respectively represent diameters of a pigment portion and a vehicle portion in an dot image formed by dropping a droplet of the inkjet ink with a volume of 0.5 µl on the recording medium.

2. The inkjet recording method according to claim 1, wherein the inkjet ink includes at least one of the compound having formula (1) and the compound having formula (2) in a total amount of from 15% by weight to 20% by weight.

3. The inkjet recording method according to claim 1, wherein the pigment is a pigment having a self-dispersing property.

4. The inkjet recording method according to claim 1, wherein the inkjet ink further includes at least one of glycerin, 1,3-butanediol, and 3-methyl-1,3-butanediol.

5. The inkjet recording method according to claim 1, wherein the inkjet ink further includes at least one of a polyol having 8 to 11 carbon atoms, and a polyol ether having 8 to 11 carbon atoms.

6. The inkjet recording method according to claim 5, wherein the inkjet ink includes a polyol having 8 to 11 carbon atoms, and wherein the polyol includes 2-ethyl-1,3-hexanediol or 2,2,4-trimethyl-1,3-pentanediol.

* * * * *